United States Patent
Makki et al.

(10) Patent No.: US 9,021,805 B2
(45) Date of Patent: May 5, 2015

(54) EXHAUST GAS RECIRCULATION CONTROL

(71) Applicant: Ford Global Technologies, LLC, Dearborn, MI (US)

(72) Inventors: Imad Hassan Makki, Dearborn Heights, MI (US); Timothy Joseph Clark, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 13/956,112

(22) Filed: Jul. 31, 2013

(65) Prior Publication Data

US 2015/0033735 A1 Feb. 5, 2015

(51) Int. Cl.
*F01N 3/00* (2006.01)
*F02D 41/14* (2006.01)
*F02D 43/00* (2006.01)

(52) U.S. Cl.
CPC ............. *F02D 41/145* (2013.01); *F02D 43/00* (2013.01)

(58) Field of Classification Search
CPC ............ F02D 2041/1431; F02D 21/08; F02D 2200/0408; F02D 41/0065; F02D 41/0077; F02D 41/145; F02D 41/18; F02M 25/0707; F02M 25/0709; F02M 25/0727; F02M 25/0738; F02M 25/0754; Y02T 10/47
See application file for complete search history.

(56) References Cited

U.S. PATENT DOCUMENTS

| 6,311,679 | B1 * | 11/2001 | Druzhinina et al. ..... 123/568.21 |
| 6,868,329 | B2 * | 3/2005 | Ito et al. ........................ 701/108 |
| 6,886,545 | B1 | 5/2005 | Holm |
| 7,267,117 | B2 | 9/2007 | Tonetti et al. |
| 8,103,427 | B2 * | 1/2012 | Osburn et al. ................. 701/108 |
| 8,251,049 | B2 | 8/2012 | Kang et al. |
| 2003/0029233 | A1 * | 2/2003 | Ting et al. .................... 73/118.1 |
| 2006/0117737 | A1 * | 6/2006 | Ohsaki ........................... 60/276 |
| 2008/0022677 | A1 * | 1/2008 | Barbe et al. ..................... 60/599 |
| 2010/0199639 | A1 * | 8/2010 | Matsunaga et al. ............. 60/278 |
| 2010/0256891 | A1 * | 10/2010 | Weiss et al. .................... 701/103 |
| 2012/0304640 | A1 * | 12/2012 | Tsuyuki ...................... 60/605.2 |

* cited by examiner

*Primary Examiner* — Jesse Bogue
(74) *Attorney, Agent, or Firm* — Julia Voutyras; Alleman Hall McCoy Russell & Tuttle LLP

(57) ABSTRACT

Methods and systems are disclosed for controlling an exhaust gas recirculation valve in an engine by determining errors in exhaust backpressure estimates and adapting EGR flow estimations based on these errors to meet target EGR dilutions in the engine. In one example approach, a method comprises adjusting valve position based on desired EGR flow and estimated EGR flow, where the estimated flow is based on estimated exhaust backpressure, and the estimated exhaust backpressure is updated based on errors between actual and desired intake oxygen concentration.

20 Claims, 3 Drawing Sheets

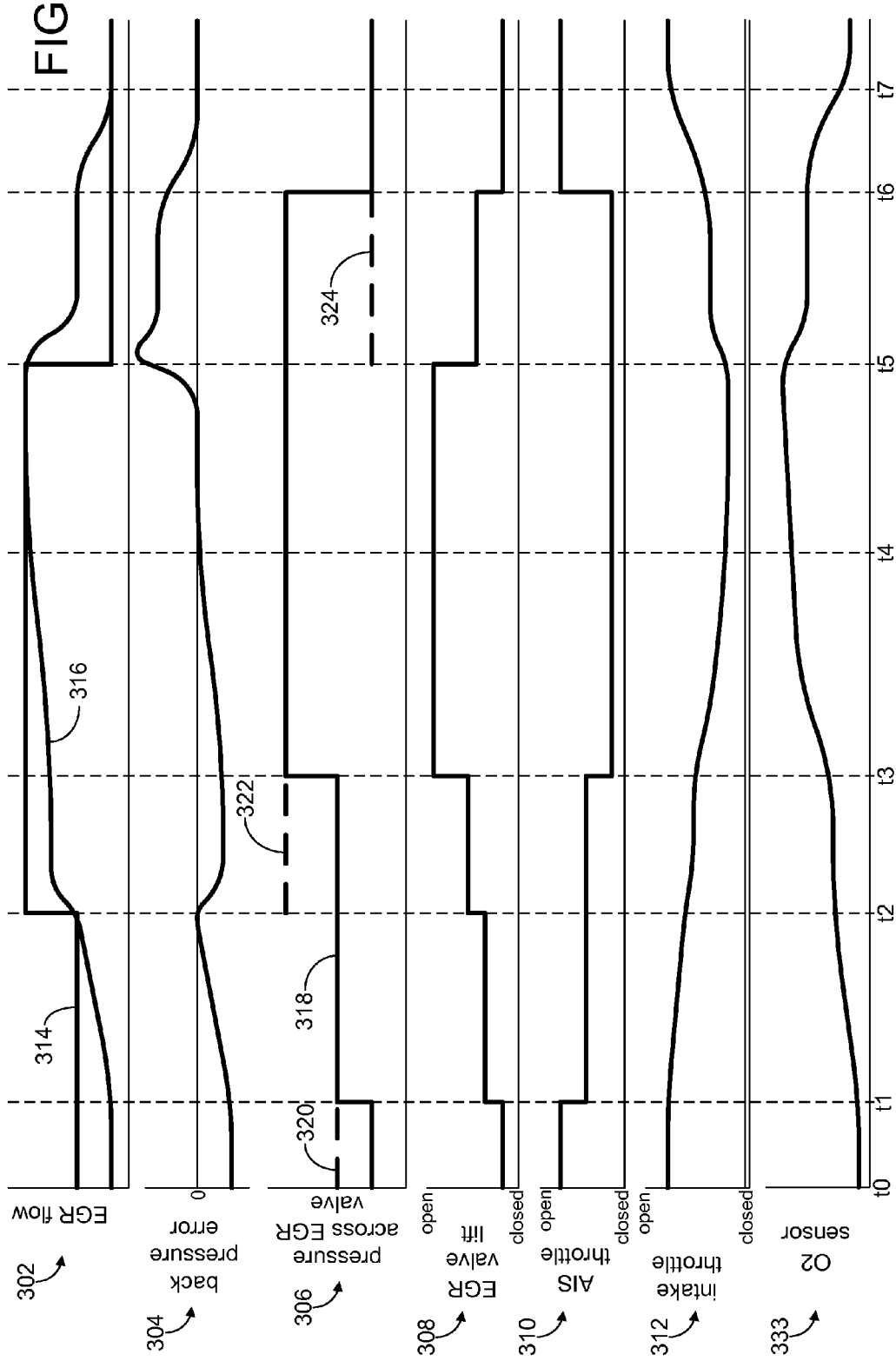

EXHAUST GAS RECIRCULATION CONTROL

BACKGROUND AND SUMMARY

Engine systems may be configured with exhaust gas recirculation (EGR) systems wherein at least a portion of the exhaust gas is recirculated to the engine intake. Such EGR systems my enable reduction in exhaust emissions while also increasing fuel economy.

Various sensors may be included in the engine system to estimate the EGR flow and control an amount of EGR delivered to the engine intake. One example of such an EGR system is illustrated by Tonetti et al. in U.S. Pat. No. 7,267,117. Herein, an oxygen sensor is included in the engine air intake, and based on the output of the oxygen sensor, a controller is configured to adjust the position of an EGR valve to thereby provide a desired amount of EGR.

EGR systems must precisely control the flow of re-circulated exhaust. For example, too much EGR flow may retard engine performance and cause a hesitation on acceleration. On the other hand, too little EGR flow may reduce the ability to decrease heat losses to coolant by lowering temperatures of combusted gases, reduce the ability to improve knock tolerance by diluting and cooling end gases, and reduce the ability to decrease/eliminate enrichment requirements by lowering exhaust gas temperatures, for example.

An EGR valve may be included in an EGR system to control EGR mass flow in order to ensure a desired EGR fraction in the intake manifold. The main function of the EGR valve is to control the amount of the returned burnt exhaust gas into the intake manifold area of an internal combustion engine. In some approaches, the EGR valve may be adjusted based on a desired EGR mass flow rate and a measured total EGR mass at an air intake system (AIS) of the engine.

The inventors herein have recognized potential issues with such EGR control system approaches. For example, the inventors herein have recognized that accurate control of an electric EGR valve requires accurate exhaust backpressure estimates, but this value can have various sources of error which degrade EGR flow estimation. For example, errors in estimating exhaust pressure differences between the output of a turbine and an EGR valve or errors in estimating a pressure drop across the EGR valve may lead to potential errors in the EGR valve position commanded by a controller. Such estimation errors could lead to either too much or too little EGR valve lift and consequently delivery of an incorrect amount of EGR to the engine intake based on engine operating conditions. Delivery of an incorrect amount of EGR to the engine intake may potentially cause fuel economy and tailpipe emissions degradations, e.g., due to engine misfire because of excessive EGR being delivered.

Thus, in one example approach, the above issues may be at least partly addressed by a method of operating an engine including an EGR passage and an oxygen sensor comprising adjusting valve position based on desired EGR flow and estimated EGR flow, where the estimated flow is based on estimated exhaust backpressure, and the estimated exhaust backpressure is updated based on errors between actual and desired intake oxygen concentration.

In this way, errors in exhaust back pressure determination based on a desired EGR rate and an actual rate determined via an intake air oxygen sensor may be used to adapt pressure estimations across the EGR valve so that a target EGR flow rate may be accurately achieved. Further, errors between actual and desired intake oxygen concentrations may be used to adaptively update exhaust back pressure estimations to control the EGR valve to meet target EGR dilutions in the engine. By determining errors in exhaust backpressure estimates and adapting EGR flow estimations based on these errors, increased accuracy in EGR valve control may be achieved thereby potentially increasing engine performance, increasing fuel economy, and reducing engine emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 illustrates an example method for controlling an exhaust gas recirculation valve in an engine, in accordance with the disclosure.

DETAILED DESCRIPTION

Figure 1:
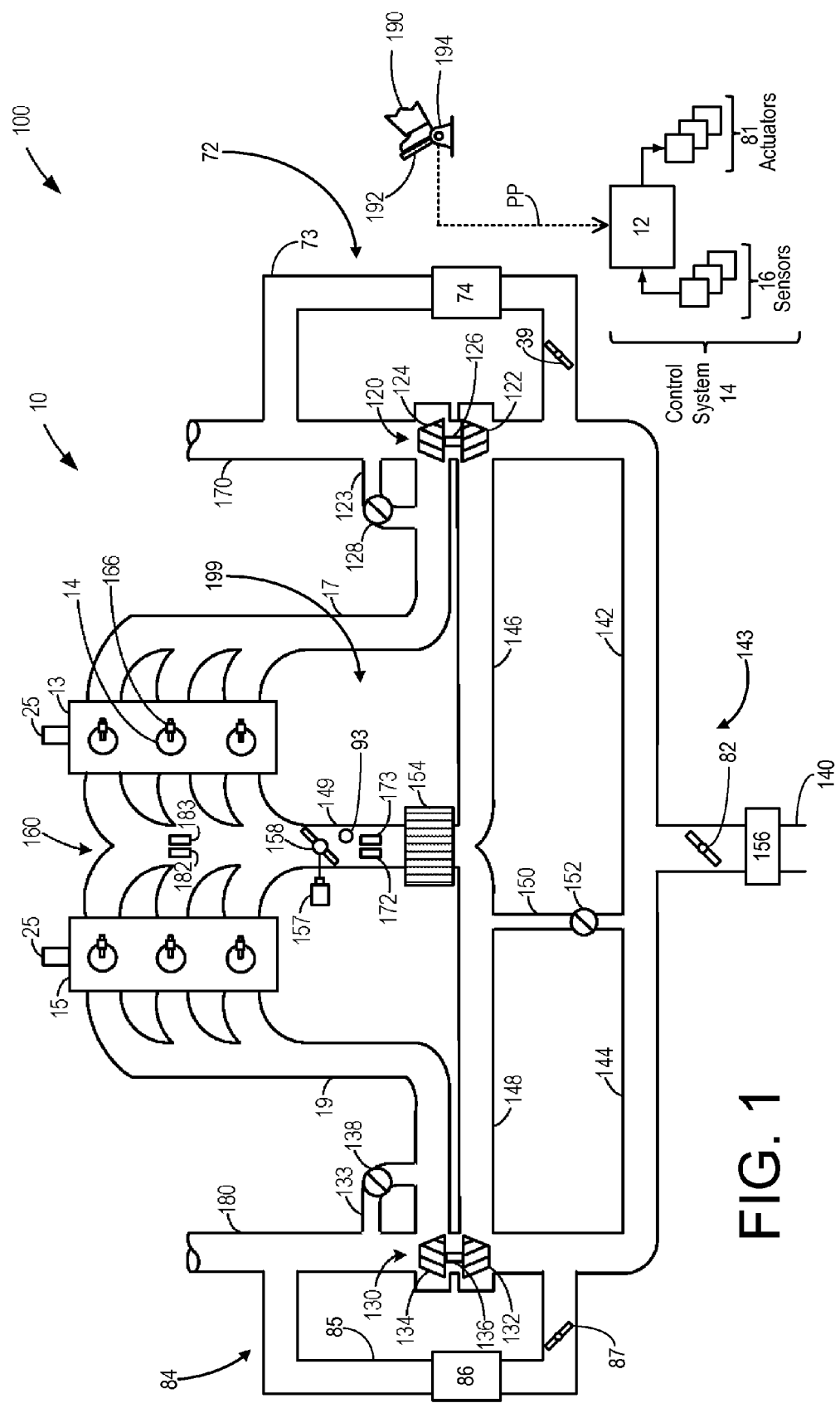
FIG. 1 shows a schematic depiction of an engine and an associated exhaust gas recirculation system.
Figure 2:
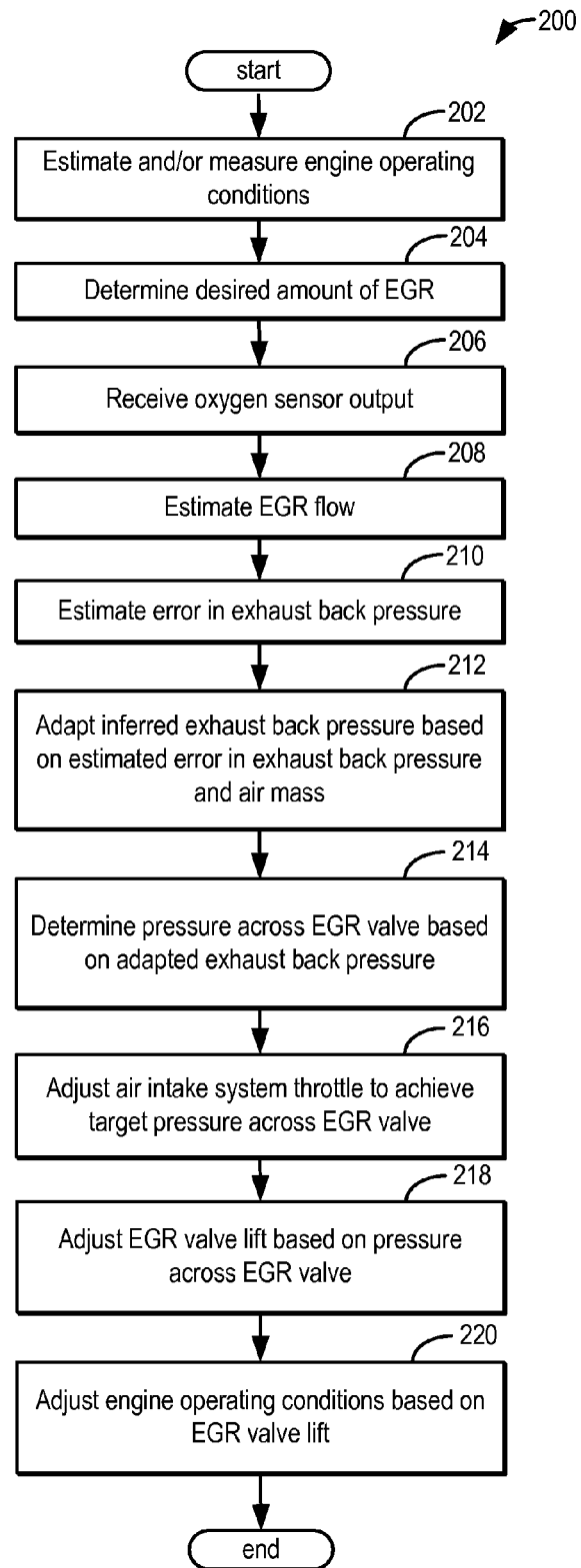
FIG. 2 shows an example method for controlling an exhaust gas recirculation valve in an engine, in accordance with the disclosure.

The following description relates to systems and methods for controlling an exhaust gas recirculation valve in an engine, e.g., the engine system shown in FIG. 1, by determining errors in exhaust backpressure estimates and adapting EGR flow estimations based on these errors to meet target EGR dilutions in the engine. As shown in FIGS. 2 and 3, errors in exhaust back pressure determination based on a desired EGR rate and an actual rate determined via an intake air oxygen sensor may be used to adapt pressure estimations across the EGR valve so that a target EGR flow rate may be accurately achieved. Further, errors between actual and desired intake oxygen concentrations may be used to adaptively update exhaust back pressure estimations to control the EGR valve to meet target EGR dilutions in the engine. By determining errors in exhaust backpressure estimates and adapting EGR flow estimations based on these errors, increased accuracy in EGR valve control may be achieved thereby potentially increasing engine performance, increasing fuel economy, and reducing engine emissions.

Turning to the figures, FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. At least a portion of the intake air can be directed to a compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include an air cooler 154 and/or a throttle 158. The position of the throttle 158 can be adjusted by the control system via a throttle actuator 157 communicatively coupled to controller 12. In some examples, intake passage 149 may include a pressure sensor 172 for estimating a pressure upstream of intake throttle 158 and/or a temperature sensor 173 for estimating air temperature (MCT), each communicating with controller 12. Intake passage 149 may further include an oxygen sensor 93. Oxygen sensor 93 may be located upstream of throttle 158 and may be used to determine an EGR dilution amount in the engine intake as described in more detail below.

In some examples, an anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system.

Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may receive a pressure difference for facilitating the actuation of wastegate 138 via the actuator from the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 170 while combustion products exhausted via exhaust passage 19 may be directed to the atmosphere via exhaust passage 180. Exhaust passages 170 and 180 may include one or more exhaust after-treatment devices or emission control devices, such as a catalyst, and one or more exhaust gas sensors. Examples of emission control devices include a particulate filter, SCR catalyst, three-way catalyst, lean NOx trap, oxidation catalyst, etc. The emission control devices may be positioned upstream and/or downstream of the turbines in the exhaust passages.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

In addition to intake throttle 158, an air induction system (AIS) 143 may include an air induction system throttle 82 configured to adjust the amount of fresh air that is received through intake passages 142 and 144. AIS throttle 82 may be positioned upstream of intake throttle 158 and upstream of compressors 132 and 122. As described in more detail below, AIS throttle 82 may be used to adjust pressures in the intake conduits 144 and 142 during engine operation.

Engine 10 may further include one or more exhaust gas recirculation (EGR) passages for recirculating at least a portion of exhaust gas from exhaust passages 170 and/or 180 to intake passages 146 and/or 148. For example, the engine may include a low-pressure EGR (LP-EGR) system 72 with an LP-EGR passage 73 coupling the engine exhaust, downstream of turbine 124, to the engine intake, upstream of compressor 122. LP-EGR system 72 may be operated during conditions such as in the presence of turbocharger boost and/or when exhaust gas temperature is above a threshold. Additionally, by adjusting AIS throttle 82, LP-EGR system 72 may be operated during conditions such as in the absence of turbocharger boost or in the presence of low boost levels. An EGR valve 39, positioned in LP-EGR passage 73 upstream of the compressor, may be configured to adjust an amount and/or rate of exhaust gas diverted through the EGR passage. EGR valve 39 may be an electric motor driven exhaust gas recirculation valve and may be actuated over the entire range between the open and closed position by an electric motor so that a nearly continuous EGR valve lift is achieved. As described below, EGR valve 39 may be adjusted based on a desired amount of EGR in the engine intake and an actual or estimated amount of EGR, where the estimated amount of EGR is determined based on sensor readings of oxygen sensor 93. LP-EGR passage 73 may further include an LP-EGR cooler 74, positioned upstream or downstream of EGR valve 39 (herein, depicted downstream of EGR valve 39), to lower the temperature of exhaust gas being recirculated into the engine intake. In this configuration, the EGR passage may be configured to provide low pressure EGR, and EGR valve 39 may be a LP-EGR valve. In alternate embodiments, a high-pressure EGR (HP-EGR) system (not shown) may also be included wherein a HP-EGR passage may be configured to divert at least some exhaust gas from the engine exhaust, upstream of the turbine, to the engine intake, downstream of the compressor.

In some examples, both banks of the engine may include an EGR system. For example, in addition to EGR system 72 coupled to the exhaust of engine bank 13, an EGR system 84 may be coupled to the exhaust of engine bank 15. EGR system 84 may include an LP-EGR passage 85 coupling the engine exhaust, downstream of turbine 134, to the engine intake, upstream of compressor 132. An EGR valve 87, positioned in LP-EGR passage 85 upstream of the compressor, may be configured to adjust an amount and/or rate of exhaust gas diverted through the EGR passage. As described below, EGR valve 87 may also be adjusted based on a desired amount of EGR in the engine intake and an actual or estimated amount of EGR, where the estimated amount of EGR is determined based on sensor readings of oxygen sensor 93. LP-EGR passage 85 may further include an LP-EGR cooler 86, positioned upstream or downstream of EGR valve 87 (herein, depicted downstream of EGR valve 87), to lower the temperature of exhaust gas being recirculated into the engine intake. In this configuration, the EGR passage may be configured to provide low pressure EGR, and EGR valve 87 may be a LP-EGR valve. In alternate embodiments, a high-pressure EGR (HP-EGR) system (not shown) may also be included wherein a HP-EGR passage may be configured to divert at least some exhaust gas from the engine exhaust, upstream of the turbine, to the engine intake, downstream of the compressor.

In some embodiments, one or more sensors may be positioned within LP-EGR passage 73 and LP-EGR passage 85 to provide an indication of one or more of a pressure, temperature, and air-fuel ratio of exhaust gas recirculated through the LP-EGR passages. Exhaust gas diverted through LP-EGR passage 73 and LP-EGR passage 85 may be diluted with fresh intake air at a mixing point located at the junction of LP-EGR passage 73 and intake passage 142 and at a mixing point located at the junction of LP-EGR passage 85 and intake passage 144. Specifically, by adjusting the EGR valves 39 and 87 in coordination with AIS throttle 82 (positioned in the air intake passage of the engine intake, upstream of the compressors), a dilution of the EGR flow may be adjusted.

A percent dilution of the EGR flow may be inferred from the output of oxygen sensor 93 in the engine intake gas stream. Specifically, oxygen sensor 93 may be positioned downstream of AIS throttle 82, downstream of EGR valves 39 and 85, and upstream of intake throttle 158, such that the EGR dilution at or close to the intake throttle 158 may be accurately determined. Oxygen sensor 93 may be, for example, an UEGO sensor. As elaborated in FIG. 2, an engine controller may estimate the percent dilution of the EGR flow based on feedback from oxygen sensor 93 and determine errors in exhaust back pressure calculations used to control the EGR valves. Based on these determined errors, control of the EGR valves may be adapted to provide a target EGR dilution to the engine.

Engine system 100 can include various other sensors. For example, each of intake passages 142 and 144 can include a mass air flow sensor (not shown). In some examples, only one of intake passages 142 and 144 can include a mass air flow (MAF) sensor. In some examples, intake manifold 160 may include an intake manifold pressure (MAP) sensor 182 and/or an intake manifold temperature sensor 183, each communicating with controller 12. In some examples, common intake passage 149 may include a throttle inlet pressure (TIP) sensor (not shown) for estimating a throttle inlet pressure (TIP) and/or a throttle inlet temperature sensor (not shown) for estimating a throttle air temperature (TCT), each communicating with controller 12.

Engine 10 may be controlled at least partially by a control system 14 including controller 12 and by input from a vehicle operator via an input device 192. For example, input device 192 may include an accelerator pedal and a pedal position sensor 194 for generating a proportional pedal position signal PP. Control system 14 is configured to receive information from a plurality of sensors 16 (various examples of which are described herein) and sending control signals to a plurality of actuators 81. As one example, sensors 16 may include oxygen sensor 93 and various sensors (not shown) in LP-EGR passages 73 and 85. Various exhaust gas sensors may also be included in exhaust passages downstream of emission control devices, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the engine system. As another example, actuators 81 may include fuel injector 166, EGR valves 39 and 87, AIS throttle 82, and intake throttle 158. Other actuators, such as a variety of additional valves and throttles, may be coupled to various locations in the engine system. Controller 12 may receive input data from the various sensors, process the input data, and trigger the actuators in response to the processed input data based on instruction or code programmed therein corresponding to one or more routines. An example control routine is described herein with regard to FIG. 2.

It should be understood that though FIG. 1 shows an example engine system including a twin turbocharger configuration, in other examples any number of turbochargers and any turbocharger configuration may be used. For example, the engine system may include a single turbocharger with a single compressor and turbine.

FIG. 2 shows an example method 200 for controlling an exhaust gas recirculation valve based errors between actual and desired intake oxygen concentration. For example, method 300 may be used to adjust EGR valve 39 and/or EGR valve 87 based on errors determined from measurements of oxygen sensor 93 in the engine intake.

At 202, method 200 includes estimating and/or measuring engine operating conditions. These may include, for example, engine speed, driver-requested torque, engine coolant temperature, catalyst temperature, VCT, MAP, BP, MAT, etc. At 204, based on the estimated operating conditions and desired torque, a desired amount of EGR may be determined. This may include determining a desired EGR percent dilution based on speed, load, engine temperature, and other engine operating conditions. Further, a desired intake oxygen concentration may be determined from the desired EGR flow, a mass air flow rate in an air intake system of the engine, e.g., as determined from a MAF sensor in the engine intake, and a temperature of the EGR. For example, the desired intake oxygen concentration may be a desired oxygen concentration as measured by oxygen sensor 93 which corresponds to the desired EGR flow rate.

At 206, the output of the intake oxygen sensor may be received. For example, the output of oxygen sensor 93 located upstream of intake throttle 158 and downstream of the compressors may be received by controller 12. In one example, the sensor output may be received as a sensor voltage. The sensor voltage may be a measure of the oxygen concentration of the intake gas stream. Thus, based on the oxygen concentration, the percent dilution of EGR in the intake gas stream, that is a ratio of fresh air and recirculated exhaust gas in the intake gas stream, may be determined.

At 208, method 200 includes estimating EGR flow. As remarked above the EGR flow may be estimated from oxygen sensor readings and may be further based on a measured air mass flow rate in the engine intake, e.g., via a MAF sensor in the engine intake, and a temperature and/or pressure in the engine intake, e.g., a temperature and/or pressure of the EGR. In some examples, the EGR flow may be determined based on an estimated exhaust back pressure where the exhaust back pressure is an amount of pressure in the EGR passage at a location between the turbine, e.g., turbine 124 or 134 and the EGR valve, e.g., valve 39 or valve 87.

At 210, method 200 includes estimating error in exhaust back pressure. For example, errors between actual and desired intake oxygen concentration may be used to estimate an error in the exhaust back pressure in the EGR system. In particular, a difference between actual and desired intake oxygen concentration may be used to determine an error amount in an exhaust pressure difference between the output of the turbine, e.g., turbine 124 or 134, and the EGR valve, e.g., valve 39 or valve 87.

In one example, the method may use the desired intake oxygen concentration (in EGR units) minus the actual intake oxygen concentration (in EGR units) to determine an error term. The method may determine that at least some of this error is due to the EGR valve control pressure being incorrect. A small control gain may be applied to the error and it is slowly integrated over time. A clip of the value may be performed if the integrated term is at a minimum or a maximum. The final, clipped, value may then be stored into memory, such as keep-alive memory (KAM). The integrated value may then be multiplied by the total engine airmass or airflow and added to the inferred exhaust back pressure. This new back pressure term may then be used in the determination of the EGR valve delta pressure for measuring EGR flow and then controlling the flow to a desired EGR flow amount to maintain a desired intake oxygen concentration, for example.

At 212, method 200 includes adapting inferred exhaust back pressure based on the estimated error in exhaust back pressure and air mass. For example, an updated exhaust back pressure based on errors between actual and desired intake oxygen concentration and an EGR air mass may be determined by applying a suitable correction to an exhaust back pressure estimation based on the determined error.

At 214, method 200 includes determining pressure across the EGR valve based on adapted exhaust gas pressure. For example, pressure across the EGR valve may be determined based on a pressure upstream of a compressor, e.g., compressor 122 or compressor 132, or at or near an inlet to the compressor and the updated, corrected exhaust back pressure. For example, pressure across the EGR valve may be based on a difference between the pressure upstream of the compressor and the exhaust back pressure, where the exhaust back pressure has been adapted to account for the error determined in step 210 described above.

In some examples, at 216, method 200 may include adjusting the air intake system throttle, e.g., AIS throttle 82, to achieve a target pressure or desired pressure difference across the EGR valve. This target pressure difference across the EGR valve may be based on the desired EGR flow to ensure that the pressure difference across the EGR valve is large enough for a closed loop controller to achieve its set-point. For example, if the pressure across the EGR valve is below the target pressure difference, then the AIS throttle may be adjusted to increase the pressure difference across the EGR valve to the target pressure difference.

At 218, method 200 includes adjusting the EGR valve based on the pressure across the EGR valve, where the pressure across the EGR valve is adjusted based on the errors between actual and desired intake oxygen concentration described above. For example, EGR valve lift may be increased or decreased based on a compressor inlet pressure and exhaust backpressure, where the exhaust backpressure is updated based on errors between actual and desired intake oxygen concentration. In some examples, the valve lift may be determined from a look-up table based on the pressure difference across the valve to achieve a target EGR dilution in the engine intake. For example, EGR valve position may be adjusted based on desired EGR flow and the corrected estimated EGR flow by increasing an opening amount of the EGR valve in response to the estimated EGR flow less than the desired EGR flow. As another example, adjusting valve position based on desired EGR flow and corrected estimated EGR flow may include decreasing an opening amount of the EGR valve in response to the estimated EGR flow greater than the desired EGR flow.

At 220, method 200 includes adjusting engine operating conditions based on the EGR valve lift. For example, an intake throttle, e.g., throttle 158, may be adjusted based on the adjustment of EGR valve position. For example, EGR valve position may be adjusted by increasing an opening amount of the EGR valve and, in response, the intake throttle may be proportionally closed as the opening amount of the EGR valve increases. As another example, in response decreasing an opening amount of the EGR valve, the intake throttle may be proportionally opened as the opening amount of the EGR valve decreases. Further, in some examples, engine spark timing may be adjusted based on the EGR valve lift. For example, a more aggressive spark timing may be performed in response to an increased EGR dilution due to an increase in opening amount of the EGR valve.

FIG. 3 illustrates an example method, e.g., method 200 described above, for controlling an exhaust gas recirculation valve based on errors between actual and desired intake oxygen concentration. Graph 302 in FIG. 3 shows EGR flow versus time, where curve 314 shows an example target or desired EGR flow and curve 316 shows an actual EGR flow determined from an oxygen sensor, e.g., sensor 93, in the intake of the engine. Graph 304, shows exhaust back pressure error versus time, where exhaust back pressure error is determined based on a difference between the desired EGR flow and the actual EGR flow shown in graph 302. Graph 306, shows pressure across the EGR valve, e.g., a pressure difference between a pressure upstream and downstream of EGR valve 39 or EGR valve 87, versus time. As remarked above, exhaust back pressure error may be used in the determination of the pressure across the EGR valve. Graph 308 shows EGR valve lift versus time, where the EGR valve lift is adjusted based on the corrected pressure across the EGR valve. Graph 310 shows an air intake system (AIS) throttle, e.g., throttle 82, versus time. As remarked above, AIS throttle 82 may be adjusted to achieve a target pressure across the EGR valve based on a desired EGR flow. Graph 312 shows intake throttle 158 position versus time where the intake throttle is used to meter an amount of EGR and intake air delivered to the engine based on engine operating conditions. Graph 333 shows measurements from oxygen sensor 93 in the engine intake versus time. As remarked above, oxygen sensor readings from oxygen sensor 93 may be used together with estimated air mass flow to determine an estimated EGR flow in the engine intake.

At time t0, the engine is operating with an actual amount of EGR, indicated by curve 316 in graph 302, less than the desired amount of EGR indicated by curve 314. The actual amount of EGR is determined via oxygen sensor readings from oxygen sensor 93 in the engine intake, an amount of air mass flow in the engine intake, and temperature and/or pressure in the engine intake. An error amount in the exhaust back pressure, as shown in graph 304, may be determined based on the difference between the actual EGR amount and the target EGR amount. This back pressure error may be used to determine an updated or corrected pressure across the EGR valve by calculating a difference between the updated back pressure and the pressure in the intake system upstream of the compressor. As shown in graph 306, the pressure across the EGR valve is less than a desired or target pressure 320 across the EGR valve. In order to increase the pressure across the EGR valve, AIS throttle 82 is adjusted to increase the back pressure across the EGR valve at time t1 so that the target pressure across the EGR valve is reached. An opening amount of the EGR valve is also increased at time t1 so that the amount of EGR increases to the target EGR value at time t2. Further, the intake throttle 158 is adjusted based on the EGR valve adjustment between times t1 and t2 to control EGR and intake air delivery to the engine based on engine operating conditions.

At time t2, in response to an engine operating condition, e.g., an engine speed, engine load, torque request, etc. the desired amount of EGR increases. Due to the increased desired amount of EGR, the actual EGR shown in curve 316 again falls below the desired EGR leading to an error in exhaust back pressure estimation. Pressure across the EGR valve is again determined based on this error between times t2 and t3. Further, between times t2 and t3, the AIS throttle is adjusted to increase pressure across the EGR valve to the target pressure 322 which is increased compared to target pressure 320 due to the increase in desired EGR flow. At time t3, the EGR valve lift is then increased so that the actual EGR flow as determined by the oxygen sensor increases to the desired EGR value at time t4 while the intake throttle is adjusted to control EGR delivery to the engine.

At time t5, a decreased desired EGR flow is requested, e.g., in response to engine operating conditions. After time t5, the actual EGR flow as determined by the oxygen sensor is greater than the desired EGR flow so that an error in exhaust back pressure estimation is present. The estimated pressure across the EGR valve is then adapted based on this error so that a corrected pressure across the EGR value is obtained between times t5 and t6. However, since the pressure across the EGR valve is greater than a target pressure 324 across the EGR valve, the AIS throttle is adjusted to decrease the pressure difference across the EGR valve to the target value 324 at time t6. The opening amount of the EGR valve is decreased at time t6 so that the actual EGR amount decreases to the desired EGR amount at time t7 while intake throttle adjustments are made to control EGR delivery to the engine based on the EGR valve adjustments.

In this way, by determining errors in exhaust backpressure estimates and adapting EGR flow estimations based on these errors, increased accuracy in EGR valve control may be achieved thereby potentially increasing engine performance, increasing fuel economy, and reducing engine emissions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an exhaust gas recirculation valve in an engine, comprising:
adjusting the EGR valve position based on desired EGR flow and estimated EGR flow, the estimated flow based on estimated exhaust backpressure, the estimated exhaust backpressure updated based on errors between a difference in measured engine intake and desired engine intake oxygen concentration.

2. The method of claim 1, wherein the measured engine intake oxygen concentration is determined via an oxygen sensor in an air intake system of the engine.

3. The method of claim 2, wherein the oxygen sensor is located upstream of an intake throttle in an intake of the engine and downstream of a compressor, and the method further comprises adjusting an air intake system throttle to achieve a desired pressure difference across the EGR valve, where the air intake system throttle is located upstream of the compressor.

4. The method of claim 1, wherein the desired engine intake oxygen concentration is based on the desired EGR flow, a mass air flow rate in an air intake system of the engine, and a temperature of the EGR.

5. The method of claim 1, wherein the estimated EGR flow is determined from the measured engine intake oxygen concentration, a mass air flow rate in an air intake system of the engine, and a temperature of the EGR.

6. The method of claim 1, wherein adjusting EGR valve position based on desired EGR flow and estimated EGR flow comprises adjusting EGR valve lift based on a compressor inlet pressure and exhaust backpressure, where the exhaust backpressure is updated based on errors between a difference in measured engine intake and desired engine intake oxygen concentration.

7. The method of claim 6, wherein the EGR valve lift is determined from a look-up table.

8. The method of claim 1, further comprising adjusting an air intake system throttle to achieve a target pressure difference across the EGR valve, the target pressure difference based on the desired EGR flow.

9. The method of claim 1, wherein adjusting EGR valve position based on desired EGR flow and estimated EGR flow includes increasing an opening amount of the EGR valve in response to the estimated EGR flow less than the desired EGR flow.

10. The method of claim 9, further comprising proportionally closing an intake throttle as the opening amount of the EGR valve increases.

11. The method of claim 1, wherein adjusting EGR valve position based on desired EGR flow and estimated EGR flow includes decreasing an opening amount of the EGR valve in response to the estimated EGR flow greater than the desired EGR flow.

12. The method of claim 11, further comprising proportionally opening an intake throttle as the opening amount of the EGR valve decreases.

13. A method of operating an engine including an oxygen sensor, and an EGR passage coupled between an engine intake and an engine exhaust comprising:
   determining an updated exhaust backpressure based on errors between a difference in measured engine intake and desired engine intake oxygen concentration; and
   adjusting EGR valve position based on a pressure difference across the EGR valve, the pressure difference based on the updated exhaust backpressure.

14. The method of claim 13, wherein the engine includes a turbocharger, and the EGR passage couples an engine exhaust, downstream of a turbine, to an engine intake, upstream of a compressor and the pressure difference across the EGR valve is determined based on a difference between pressure at an inlet of the compressor and the updated exhaust backpressure.

15. The method of claim 13, wherein the updated exhaust backpressure is determined based on errors between a difference in measured engine intake and desired engine intake oxygen concentration and an EGR air mass.

16. The method of claim 13, wherein the actual intake oxygen concentration is determined via the oxygen sensor, where the oxygen sensor is located in an air intake system of the engine upstream of an intake throttle.

17. The method of claim 13, further comprising adjusting an intake throttle based on an adjustment of EGR valve position.

18. An engine system, comprising:
   an engine intake;
   an engine exhaust;
   a turbocharger, including a compressor and a turbine, coupled between the engine intake and engine exhaust;
   a low pressure EGR passage configured to divert at least some exhaust gas from the engine exhaust, downstream of the turbine, to the engine intake, upstream of the compressor;
   an EGR valve positioned in the EGR passage, upstream of the compressor, and configured to adjust an amount of exhaust gas diverted through the EGR passage;
   an intake throttle in an intake of the engine located downstream of the compressor;
   an air intake system throttle located upstream of the compressor;
   an oxygen sensor coupled to the intake of the engine upstream of the intake throttle and downstream of the compressor;
   a controller configured to:
      determine an updated exhaust backpressure based on errors between a difference in measured engine intake and desired engine intake oxygen concentration, where the measured engine intake oxygen concentration is determined via the oxygen sensor; and
      adjust a position of the EGR valve based on a pressure difference across the EGR valve, the pressure difference based pressure at an inlet of the compressor and the updated exhaust backpressure.

19. The system of claim 18, wherein the controller is further configured to adjust the air intake system throttle to achieve a target pressure difference across the EGR valve, where the target pressure difference based on the desired EGR flow.

20. The system of claim 19, wherein the controller is further configured to adjust the intake throttle based on the position of the EGR valve.

* * * * *